Patented Dec. 21, 1937

2,103,140

UNITED STATES PATENT OFFICE 2,103,140

METHOD FOR THE PRODUCTION OF XANTHATES OF RESIN ALCOHOLS

William T. Bishop, Wilmington, Del., assignor to Hercules Powder Company, Wilmington, Del., a corporation of Delaware No Drawing. Application May 16, 1935, Serial No. 21,804

11 Claims. (Cl. 260—99.11)

This invention relates to a method for the production of xanthates of resin alcohols.

Heretofore it has been suggested to produce xanthates by reacting an alcohol having more than eight carbon atoms and a melting point below 45° C. with carbon disulphide in the presence of an alkali (French Patent No. 710,229).

Now in accordance with this invention, contrary to what would be expected from the state of the prior art, it has been found that xanthates of resin alcohols, as, for example, alcohols derived from resin acids, such as abietic acid, pimaric acid, etc., can be produced by treating a resin alcohol with an alkali metal hydroxide, as, for example, sodium hydroxide, potassium hydroxide, etc., and then xanthating the resultant alcoholate by treatment with carbon disulphide.

In carrying out the method in accordance with this invention a resin alcohol including hydrogenated and unhydrogenated resin alcohols, or mixtures thereof, may be used, it being understood that the term "resin alcohol" is intended to include both hydrogenated and unhydrogenated resin alcohols. Thus, for example, abietyl alcohol, or hydro-abietyl alcohol, or the alcohol or hydrogenated alcohol derived from pimaric acid, etc., or mixtures thereof, may be used. Where a hydrogenated resin alcohol is used, it may be of any desired degree of hydrogenation. In the treatment of a resin alcohol with an alkali metal hydroxide an elevated temperature will desirably be provided. Thus, a temperature within the range about 50° C.–200° C. will be desirable. Any suitable alkali metal hydroxide may be used. Generally speaking, in the treatment of a resin alcohol, with an alkali metal hydroxide for the formation of an alcoholate, procedure may involve treating at a temperature above the boiling point of water with or without an inert solvent as, for example, heptane, toluol, etc., in order that water formed in the reaction will be removed. The alcoholate will be xanthated by treatment with carbon disulphide.

The xanthate may be readily recovered on completion of the treatment of the alcoholate with carbon disulphide by, for example, dissolving the reaction mass in a suitable solvent, as, for example, acetone, chloroform, etc., and effecting precipitation of the xanthate from the solution by adding thereto a precipitant as, for example, petroleum ether, toluene, etc. The precipitate is separated by filtration and where maximum purity is desired, it will be reprecipitated from, for example, solution in acetone.

As illustrative of the practical adaptation of this invention to the production, for example, of hydro-abietyl xanthate, for example, 50 grams of hydrogenated abietyl alcohol of 82% alcohol content and 10 grams of powdered potassium hydroxide were heated for about two hours at a temperature of about 150° C. During the heating the mixture was stirred continuously. On cooling an excess over 14 grams of carbon disulphide were added to the mass and the mixture stirred at intervals over a period of one hour. About 75 cc. of acetone were then added and largely dissolved the mass. The xanthate was then precipitated from the acetone solution, after filtering to remove unreacted hydroxide and other insolubles, by addition to the solution of a precipitant, as petroleum ether. On filtering and drying the xanthate, obtained as a white solid, amounted to about 15–16 grams. The xanthate was soluble in water and much foaming resulted on shaking it with water. Analysis of the xanthate showed 12.72% of sulphur in comparison with a theoretical sulphur of 15.8.

Precipitation of the xanthate from, for example, acetone solution gave a product which analyzed 15.2% sulphur, indicating a product of high purity.

As further illustrative of practical procedure in accordance with this invention, for example, 50 grams of hydrogenated abietyl alcohol of 80% alcohol content and 5.2 grams of sodium monoxide were heated together at a temperature of 110° C. for about one hour. During the heating the mass was stirred by a mechanical stirrer. On completion of the heating the mass was cooled down to room temperature and a sufficient excess over 13 g. of carbon disulphide was added in order that the reaction mass could be well mixed. The mixing was continued for about one-half hour. 50 cc. of acetone was then added and the unreacted sodium monoxide was filtered off. The xanthate was precipitated from the acetone solution by the addition of petroleum ether, filtered and dried. About 8–10 g. of a solid, water-soluble material was obtained, which analyzed 12.70% sulphur.

In proceeding a concentrated aqueous solution of alkali metal hydroxide may be used in the formation of the alcoholate, and in such case procedure may be in the presence of an inert solvent of a boiling point higher than 100° C. as, for example, toluol, or in the absence of an inert solvent, at room temperature or slightly above, for example, a temperature of 30° C.–40° C.

Following the procedure of the above example, the xanthate of various resin alcohols, as abietyl alcohol, the alcohol derived from pimaric acid, etc. may be produced.

Resin alcohol xanthates produced by the method in accordance with this invention will be found to be adaptable advantageously for various commercial uses and will be found to be excellent collectors for use in the flotation of ores and to be excellent wetting out agents for use in textile baths.

The method in accordance with the invention will be found to be economical and efficient.

It will be appreciated from the above disclosure that the resin alcohols referred to therein are not those few alcohols which occur naturally in some resinous materials, but are, on the contrary, the alcohols corresponding to the resin acids, such as abietic acid, pimaric acid, etc., and are formable by carboxylic reduction of such resin acids.

It will be understood that various modifications may be made in the procedure generally and as described and specifically illustrated above without departing from the scope of this invention.

What I claim and desire to protect by Letters Patent is:

1. The method of producing a xanthate of an alcohol produced by carboxylic reduction of a natural resin acid, which includes reacting such alcohol with a substance from the group consisting of alkali metal hydroxides and alkali metal monoxides, and xanthating the alcoholate produced.

2. The method of producing a xanthate of an alcohol produced by carboxylic reduction of a natural resin acid, which includes reacting a hydrogenated alcohol produced by carboxylic reduction of a natural resin acid with a substance from the group consisting of alkali metal hydroxides and alkali metal monoxides, and xanthating the alcoholate produced.

3. The method of producing a xanthate of an alcohol produced by carboxylic reduction of a natural resin acid, which includes heating such alcohol with a substance from the group consisting of alkali metal hydroxides and alkali metal monoxides, and xanthating the alcoholate produced.

4. The method of producing a xanthate of an alcohol produced by carboxylic reduction of a natural resin acid, which includes refluxing such alcohol with a substance from the group consisting of alkali metal hydroxides and alkali metal monoxide, and xanthating the alcoholate produced.

5. The method of producing a xanthate of abietyl alcohol which includes reacting abietyl alcohol with a substance from the group consisting of alkali metal hydroxides and alkali metal monoxides and xanthating the alcoholate produced.

6. The method of producing a xanthate of pimaryl alcohol, which includes reacting pimaryl alcohol with a substance from the group consisting of alkali metal hydroxides and alkali metal monoxides, and xanthating the alcoholate produced.

7. The method of producing a xanthate of an alcohol produced by carboxylic reduction of a natural resin acid, which includes reacting such alcohol with a substance from the group consisting of alkali metal hydroxides and alkali metal monoxides, xanthating the alcoholate produced, dissolving the xanthate, and precipitating the xanthate from the solution thereof.

8. The method of producing a xanthate of hydroabietyl alcohol which includes reacting hydroabietyl alcohol with a substance from the group consisting of alkali metal hydroxides and alkali metal monoxides, and xanthating the alcoholate produced.

9. The method of producing xanthates of a mixture of hydrogenated and unhydrogenated alcohols produced by carboxylic reduction of natural resin acid, which includes treating a mixture of such alcohols with a substance from the group consisting of alkali metal hydroxides and alkali metal monoxide, and xanthating the alcoholate produced.

10. The method of producing a xanthate of an alcohol produced by carboxylic reduction of a natural resin acid, which includes reacting such alcohol at temperatures within about the range of 50° C. to about 200° C. with a substance from the group consisting of alkali metal hydroxides and alkali metal monoxides, and xanthating the alcoholate produced.

11. The method of producing a xanthate of an alcohol produced by carboxylic reduction of a natural resin acid, which includes reacting such alcohol in the presence of an inert solvent at a temperature above 100° C. with a substance from the group consisting of alkali metal hydroxides and alkali metal monoxides, and xanthating the alcoholate produced.

WILLIAM T. BISHOP.